United States Patent
Yokozato et al.

[15] 3,675,557
[45] July 11, 1972

[54] MIRROR MOVING MECHANISM FOR SINGLE-LENS REFLEX CAMERAS

[72] Inventors: Junichi Yokozato; Shigeru Kurihara, both of Tokyo, Japan

[73] Assignee: Zenza Bronica Kogyo Kabushiki Kaisha, Tokyo, Japan

[22] Filed: May 28, 1969

[21] Appl. No.: 828,463

[30] Foreign Application Priority Data

June 5, 1968    Japan....................................43/38125

[52] U.S. Cl....................................................95/42, 95/44
[51] Int. Cl. ..........................................................G03b 19/12
[58] Field of Search....................................................95/42, 44

[56] References Cited

UNITED STATES PATENTS

| | | | |
|---|---|---|---|
| 2,891,454 | 6/1959 | Sauer et al. | 95/42 |
| 2,949,073 | 8/1960 | Weiss | 95/42 |
| 3,254,584 | 6/1966 | Okajima | 95/42 |

FOREIGN PATENTS OR APPLICATIONS

| | | | |
|---|---|---|---|
| 880,997 | 6/1953 | Germany | 95/42 |
| 1,249,670 | 9/1967 | Germany | 95/42 |

*Primary Examiner*—Samuel S. Matthews
*Assistant Examiner*—Richard L. Moses
*Attorney*—Michael S. Striker

[57] ABSTRACT

A single-lens reflex camera wherein the device which reflects light against the focussing screen consists of a single mirror which is pivotable at a point close to its upper edge or of two discrete mirrors which are pivotable in opposite directions with reference to each other. The single mirror is pivotable from a position at an angle of 45° with reference to the optical axis to a position in which its reflecting surface faces the focussing screen by pivoting and by simultaneously moving rearwardly and upwardly so as to permit the placing of the lens close to the plane of an unexposed film frame. If the light is reflected by two discrete mirrors, one of the mirrors is movable in the same way as the single mirror or about a fixed pivot axis, and the other mirror is pivotable to a concealed position behind an internal wall of the camera body. The single mirror or the two discrete mirrors can automatically return to operative positions upon completion of each exposure or they can be held in inoperative positions during the interval between the completion of an exposure and the next following transport of film or as long as desired.

4 Claims, 7 Drawing Figures

INVENTOR
JUNICHI YOKOZATO
SHIGERU KURIHARA.

ATTORNEY

INVENTOR
JUNICHI YOKOZATO
SHIGERU KURIHARA

BY

ATTORNEY 3,675,557

MIRROR MOVING MECHANISM FOR SINGLE-LENS REFLEX CAMERAS

BACKGROUND OF THE INVENTION

The present invention relates to photographic apparatus in general, and more particularly to improvements in single-lens reflex cameras. Still more particularly, the invention relates to improvements in actuating means for moving the mirror which reflects scene light against the focussing screen in a single-lens reflex camera.

In presently known single-lens reflex cameras, the light reflecting mirror is pivotable between a position at an angle of 45° with reference to the optical axis and an upper or inoperative position to thereby permit scene light to reach a film frame. The mirror is pivotable about an axis which is located in the region of its upper edge and is moved to the inoperative position in response to actuation of the shutter release element. The mirror reassumes the operative position when the exposure is completed.

A drawback of such cameras is that the mirror is pivotable about an axis which is adjacent to or coincides with its upper edge. Thus, when the mirror pivots upwardly, its lower edge moves along an arcuate path and approaches the picture taking lens of the camera. In order to avoid a collision between the lens and the lower edge of the reflecting mirror, the lens must be mounted in a position forwardly of the path of the lower edge portion of the mirror. This renders it impossible to equip a conventional single-lens reflex camera with a picture taking lens of short focal length. Also, the cameras using such pivotable mirrors cannot be provided with large-diameter lenses and the cameras cannot use film having large film frames. If the film frame is large, the mirror is also large and requires more room for pivotal movement to the inoperative position.

In certain other single-lens reflex cameras, the mirror causes secondary reflection of light which enters the camera body in the course of an exposure. This is due to the fact that the light-reflecting surface of the mirror is not concealed when the mirror dwells in its inoperative position.

In accordance with one of my earlier proposals, a one-piece reflecting mirror is pivotable in a downward direction so that it is located at a level below the lens when the camera is ready to make an exposure. Such mounting of the mirror eliminates several drawbacks of conventional mirrors but the camera must be provided with a light-intercepting member which prevents secondary reflection of scene light during the making of exposures.

SUMMARY OF THE INVENTION

An object of the invention is to provide a single-lens reflex camera with a novel and improved mirror which reflects scene light against the focussing screen in the view-finder of the camera.

Another object of the invention is to provide the camera with novel actuating means for moving the mirror between operative and inoperative positions.

A further object of the invention is to provide a single-lens reflex camera with a mirror which cannot cause secondary reflection of light in the course of an exposure and which actually prevents secondary reflection of scene light.

An additional object of the invention is to provide a single-lens reflex camera with a mirror which may but need not return to its operative position upon completion of an exposure.

Still another object of the invention is to provide a single-lens reflex camera with a mirror which renders it possible to make exposures with a lens of short focal length.

DESCRIPTION OF THE PREFERRED EMBODIMENTS

Figure 1:
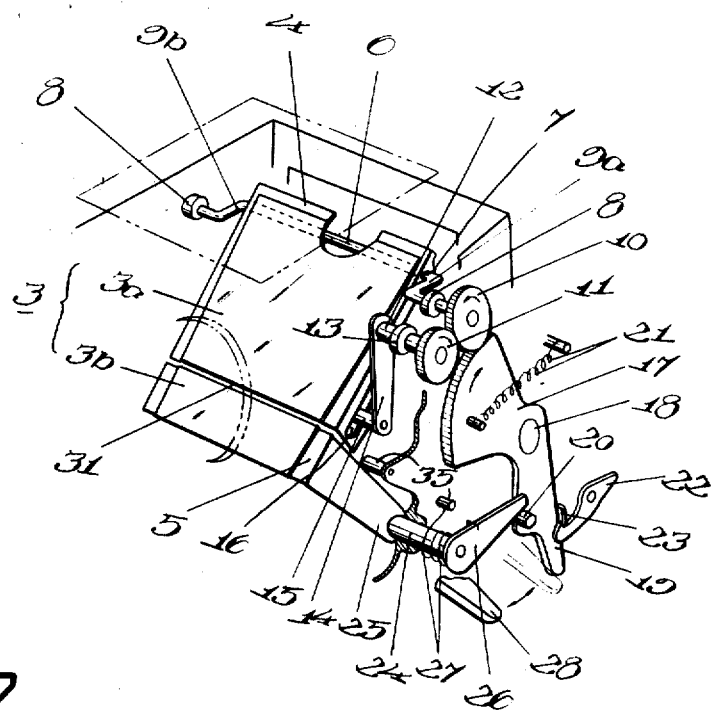
FIG. 1 is a fragmentary perspective view of a first single-lens reflex camera which embodies a two-piece reflecting mirror and a first actuating mechanism having a drive for moving the portions of the mirror between operative and inoperative positions.
Figure 2:
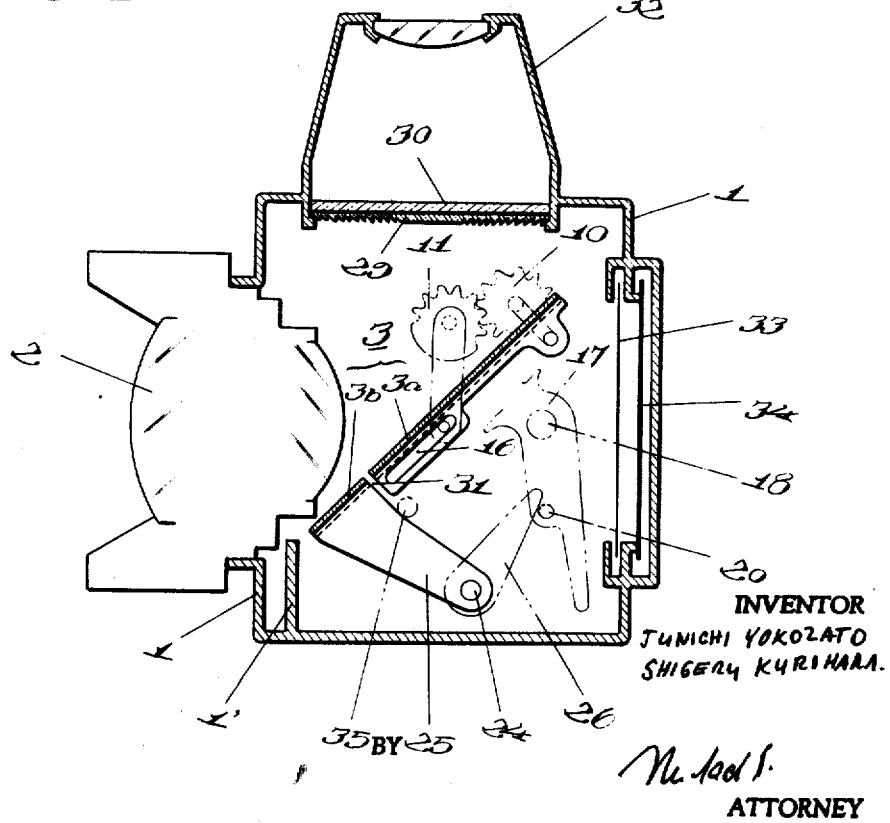
FIG. 2 is a diagrammatic vertical sectional view of the camera which embodies the structure of FIG. 1, the portions of the mirror being shown in their operative positions.
Figure 3:
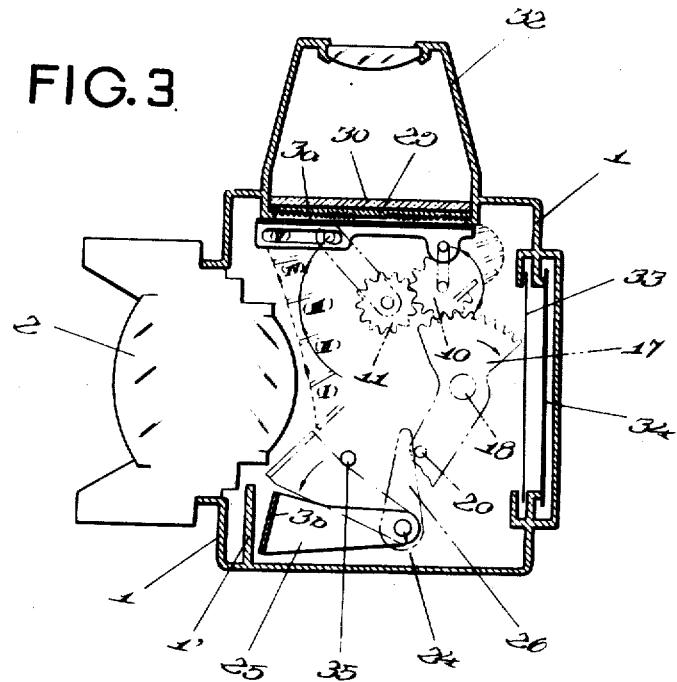
FIG. 3 illustrates the camera in the sectional view of FIG. 2 but with the portions of the mirror shown in their inoperative positions.

Referring first to FIGS. 1 to 3, the numeral 1 denotes the camera body, the numeral 2 a picture taking lens mounted in the front portion of the camera body 1, and the numeral 3 a composite light reflecting mirror which is normally positioned at an angle of 45° with reference to the optical axis of the lens 2. The reflecting mirror 3 comprises a relatively long upper mirror portion 3a and a relatively short lower mirror portion 3b. The mirror portions 3a, 3b are respectively mounted in upper and lower mirror frames 4 and 5. The camera of FIGS. 5 to 7 employs a one-piece light reflecting mirror 3.

The upper portion of the frame 4 has a bearing 7 for the median portion of a crankshaft 6 which comprises crank arms 9a, 9b flanking the bearing 7 and being rotatable in bearings 8 provided therefor in the camera body 1. The median portion of the crankshaft 6 defines a pivot axis for the mirror portion 3a. The crank arm 9a extends from the camera body 1 and is connected to a driver gear 10 which meshes with a second driver gear 11 mounted on a shaft 12 which extends into the camera body and is journalled in a bearing 13. The shaft 12 is secured to one end of a lever 14 the other end of which carries a roller 15 extending into an elongated slot 16 provided in one side of the lower portion of the upper mirror frame 4. The slot 16 is parallel to the plane of the upper mirror portion 3a. A gear segment 17 is mounted on a shaft 18 and meshes with the gear 10 on the crankshaft 6. The gear segment 17 has an arm 19 which is provided with a pin 20 and with a projection 23. A helical spring 21 one end of which is anchored in the camera body 1 biases the gear segment 17 in a clockwise direction, as viewed in FIGS. 1 to 3. The numeral 22 denotes a pawl which is pivotably mounted in the camera body 1 and can engage the projection 23 of the arm 19 so as to hold the gear segment 17 against rotation under the action of the spring 21. The pawl 22 can be disengaged from the projection 23 in response to actuation of a shutter release element (not shown).

A shaft 24 which is rotatably mounted in the camera body 1 carries a rigidly connected lever 26 which is biased against the pin 20 of the arm 19 by a torsion spring 27. The shaft 24 is further rigidly connected with a second lever 25 which supports the frame 5 for the lower mirror portion 3b. A film advancing or transporting lever 28 can be moved from the solid-line position to the phantom-line position of FIG. 1 to thereby pivot the gear segment 17 in a counterclockwise direction. A lens 29 having a lower surface provided with a continuous groove is mounted in the top wall of the camera body 1 directly below a focussing screen 30. The latter is mounted in the bottom part of a hood 32. The purpose of the lens 29 is to insure that the boundary line 31 between the mirror portions 3a, 3b will not appear clearly on the focussing screen 30, i.e., that only the image will clearly appear. The shutter is shown at 33, the film at 34 and a stop for the lower mirror portion at 35.

The operation of the camera shown in FIGS. 1 to 3 is as follows:

During forward transport of the film 34, the lever 28 is shifted from the solid-line to the phantom-line position of FIG. 1 whereby the gear segment 17 pivots in a counterclockwise direction about the axis of the shaft 18. The lever 28 is thereupon returned to the solid-line position of FIG. 1 while the pawl 22 engages the projection 23 and holds the gear segment 17 in the position of FIG. 1 in which the mirror portions 3a, 3b are located in a plane making an angle of 45° with the optical axis.

By pressing the shutter release element, the user pivots the pawl 22 to disengage its pallet from the projection 23 of the arm 19 whereby the gear segment 17 rotates in a clockwise direction under the action of the spring 21. The gear 10 is rotated in a counterclockwise direction and drives the gear 11 in a clockwise direction. The crank shaft 6 lifts the upper portion of the mirror frame 4 and, at the same time, the lever 14 lifts the lower portion of the mirror frame 4 in response to a clockwise rotation of the gear 11. The mirror portion 3a is thereby lifted to the position V of parallelism with the focussing screen 30 (see FIG. 3). Several intermediate positions of the upper mirror frame 4 are shown in FIG. 3 by phantom lines and are indicated by characters I, II, III and IV. It will be seen that, when the release element is depressed, the pivot axis of the upper mirror portion 3a moves upwardly and rearwardly i.e., sideways) because the gear 10 rotates the median portion of the crankshaft 6 and the bearing 7 in a counterclockwise direction while the roller 15 lifts the lower portion of the mirror frame 4. The frame 4 and the mirror portion 3 prevent scene light from reaching the focussing screen 30 during opening of the shutter 33.

When the gear segment 17 rotates the gear 10 in a counterclockwise direction to move the upper portion of the mirror frame 4 upwardly and rearwardly, the pin 20 on the arm 19 of the gear segment 17 pivots the lever 26 in a counterclockwise direction against the opposition of the spring 27 whereby the shaft 24 pivots the lever 25 and the lower mirror frame 5 in a counterclockwise direction to the position shown in FIG. 3 by solid lines. The reflecting surface of the mirror portion 3b is then located behind an internal wall 1' of the camera body 1. The movement of the mirror portion 3b from the solid-line position of FIG. 2 to the solid-line position of FIG. 3 takes place along an arcuate path having its center of curvature on the axis of the shaft 24. The shutter 33 is opened to expose the film 34 to scene light while the mirror portions 3a and 3b dwell in the inoperative positions shown in FIG. 3.

When the exposure is completed, the user cocks the shutter 33 and transports the film 34 whereby the gear segment 17 pivots in a counterclockwise direction to respectively rotate the gears 10 and 11 in a clockwise and in a counterclockwise direction. The portions 3a, 3b of the mirror 3 are thereby returned to the positions shown in FIG. 2 to be located in a plane which makes with the optical axis of the lens 2 an angle of 45°. The lower mirror frame 5 is pivoted from the position of FIG. 3 to the position of FIG. 2 under the action of the spring 27 and the upper mirror frame 4 is pivoted to the position of FIG. 2 by the median portion of the crankshaft 6 and by the roller 15 in the slot 16 of the frame 4. The pawl 22 reengages the projection 23 of the gear segment 17 and remains in the position of FIG. 1 until the user decides to make the next exposure. Such next exposure is made in response to actuation of the release element which disengages the pawl 22 from the projection 23 so that the gear segment 17 can rotate under the action of the spring 21. It will be seen that, unless the user causes the lever 28 to return the projection 23 of the gear segment 17 into engagement with the pawl 22, the mirror portions 3a, 3b remain in the inoperative positions which are shown in FIG. 3. As will be described in connection with FIGS. 5 to 7, the camera can be provided with means for automatically returning the mirror portions 3a, 3b to the operative positions of FIG. 2 upon completion of each exposure.

Figure 4:
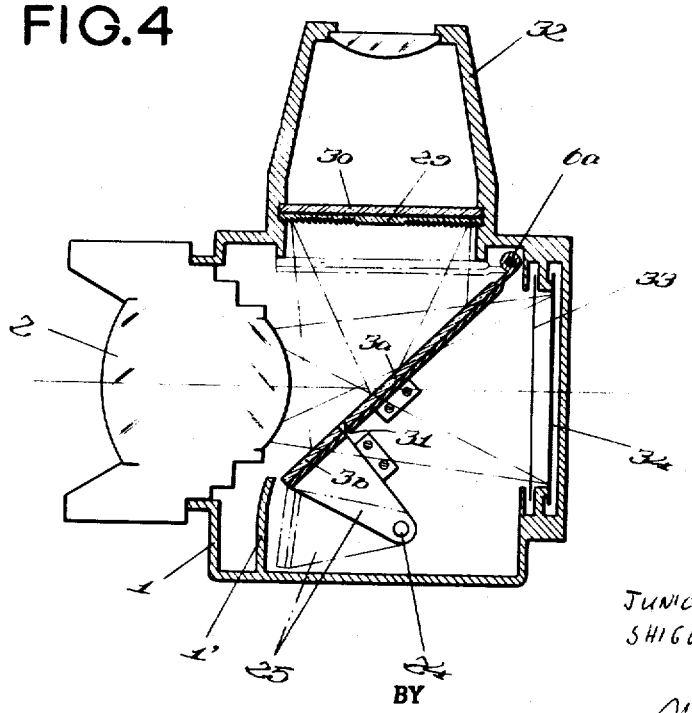
FIG. 4 is a diagrammatic vertical sectional view of a second single-lens reflex camera with a two-piece mirror and with a modified actuating mechanism for moving the portions of the mirror between operative and inoperative positions.

FIG. 4 illustrates certain details of a slightly modified camera wherein the upper mirror portion 3a is pivotable about the axis of a shaft 6a which replaces the crankshaft 6 and the roller 15 of the camera shown in FIGS. 1 to 3. Otherwise, the manner in which the mirror portions 3a, 3b are pivotable between the solid-line and phantom-line positions of FIG. 4 is the same as described in connection with FIGS. 1 to 3 excepting that the upper mirror portion 3a performs a simple pivotal movement about a fixed axis.

Figure 5:
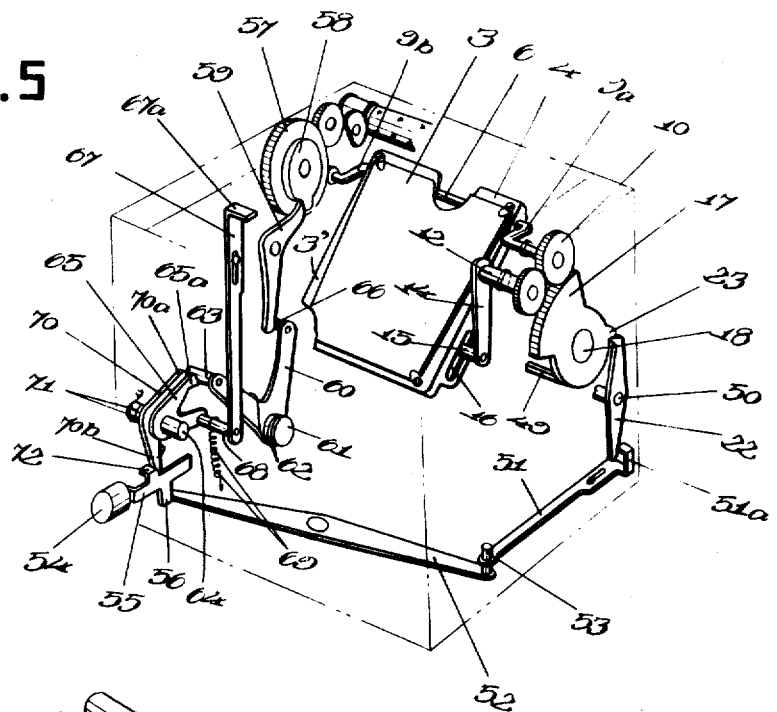
FIG. 5 is a diagrammatic perspective view of a third single-lens reflex camera with a one-piece mirror and with means for selectively retaining the mirror in its inoperative position, the mirror being shown in operative position.
Figure 6:
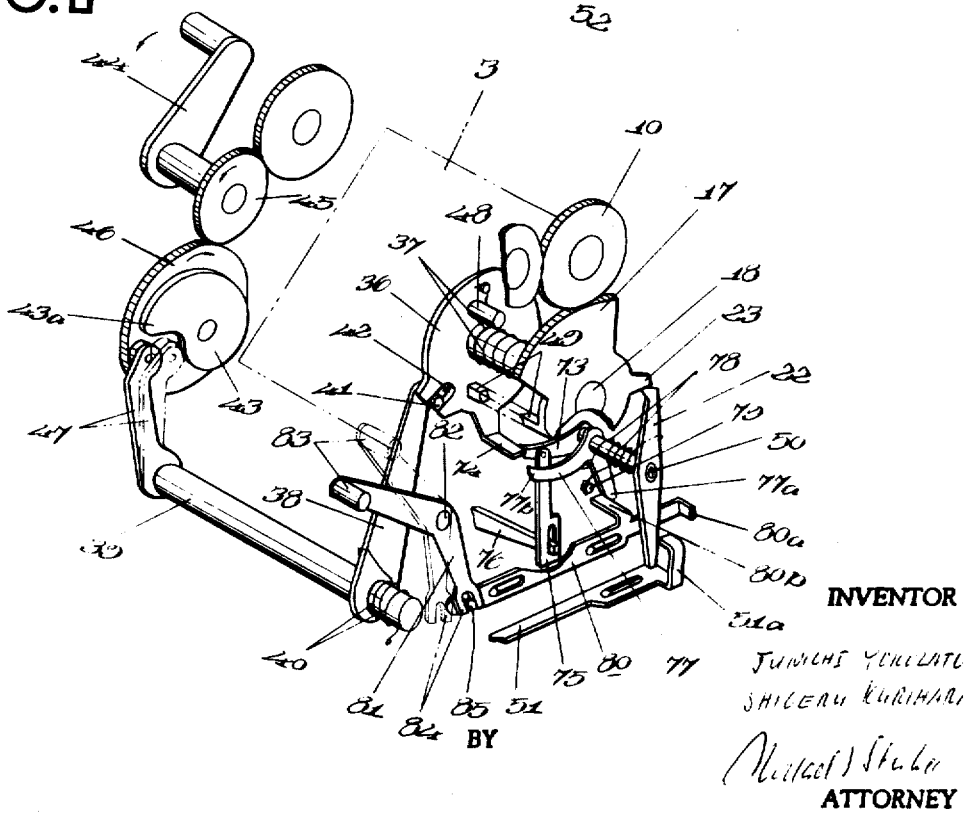
FIG. 6 is a perspective view of certain parts of the structure shown in FIG. 5 and of certain additional components of the third camera.
Figure 7:
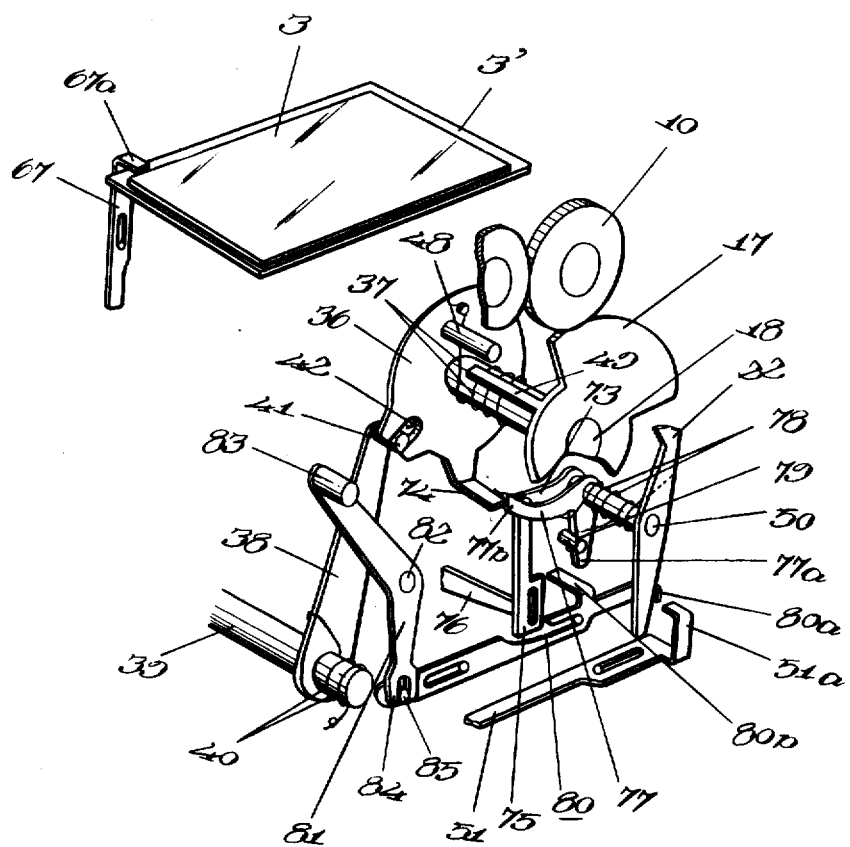
FIG. 7 is an enlarged view of a detail in the structure of FIG. 6, with the mirror shown in its inoperative position.

The camera of FIGS. 5 to 7 can employ a light reflecting mirror which consists of several portions or which is a one-piece body denoted by the numeral 3 and mounted in a frame 3' which performs movements similar to those of the frame 4 shown in FIGS. 1 to 3. In FIG. 5, the mirror 3 is located in a plane making an angle of 45° with the optical axis of the lens, not shown. FIG. 7 shows the mirror 3 in the raised or inoperative position in which its reflecting surface is adjacent to the underside of the focussing screen (not shown).

The camera of FIGS. 5 to 7 further comprises a plate-like driving member 36 which is rotatably mounted on the shaft 18 for the gear segment 17. A torsion spring 37 which is convoluted around the shaft 18 replaces the spring 21 of FIGS. 1 to 3 and has one of its ends engaging a retainer on the driving member 36. The other end of the spring 37 bears against a retainer of the gear segment 17 so that the segment 17 is biased in a clockwise direction while the driving member 36 tends to rotate in a counterclockwise direction.

A lever 38 is secured to a shaft 39 and is biased in a clockwise direction, as viewed in FIGS. 6 and 7, by a torsion spring 40. A pin 41 at the upper end of the lever 38 extends into a slot 42 of the driving member 36. The lever 38 can be pivoted by a crank 44 which serves to rotate a gear 45 meshing with a gear 46. The gear 46 carries a plate cam 43 having a lobe 43a and being tracked by a follower 47 secured to the shaft 39 for the lever 38. The cam 43 completes one revolution during each transport of the film by the length of a frame and thereby causes the follower 47 to pivot in a counterclockwise direction to stress the spring 40. The pin 41 of the lever 38 then causes the driving member 36 to rotate in a clockwise direction. A pin 48 on the driving member 36 is then moved into engagement with a projection or stop 49 on the gear segment 17.

The pawl 22 is pivotable on a shaft 50. The pallet at the upper end of the pawl 22 engages the projection 23 on the gear segment 17 prior to the making of an exposure. The lower portion of the pawl 22 is located in the path of movement of an upwardly bent end portion 51a provided on a reciprocable link 51. The link 51 can be moved back and forth by a coupling pin 53 provided on one arm of a two-armed lever 52 which is pivotable with reference to the bottom wall of the camera body and the other arm of which can be engaged by a downwardly extending projection 56 provided on the shank 55 of the release element 54.

The camera of FIGS. 5 to 7 further includes a mechanism for rapidly returning the mirror 3 to the position of FIG. 5 and a mechanism for holding the mirror 3 in the inoperative position of FIG. 7. A gear 57 which is driven by the gear 45 in response to rotation of the crank 44 carries a plate cam 58 which cooperates with a holder 59 for the front curtain of the shutter 33 (not shown in FIGS. 5 to 7). A lever 60 serves to disengage the holder 59 from the cam 58 so as to permit the front curtain of the shutter to move independently of the cam 58. The lever 60 is mounted on a shaft 61 which is biased in a counterclockwise direction by a spring 62 to urge a pin 66 of the lever 60 against the lower arm of the curtain holder 59 and to urge a second pin 63 of the lever 60 against the arm 65a of a first trip 65. The trip 65 is mounted on a shaft 64 and its other arm is coupled to a pin 68 which is biased downwardly, as viewed in FIG. 5, by a helical spring 69. The pin 68 is provided at the lower end of a link 67 having a bent upper end portion 67a which extends into the path of movement of the frame 3' for the mirror 3. When the mirror 3 is caused to pivot to the position of FIG. 7, the frame 3' engages the end portion 67a and lifts the link 67 whereby the trip 65 moves its arm 65a away from the pin 63 on the lever 60. The link 67 then stresses the spring 69.

A second or auxiliary trip 70 is freely rotatable on the shaft 64 for the trip 65 and is biased in a clockwise direction by a torsion spring 71. The upper arm 70a of the auxiliary trip 70 engages the pin 63 of the lever 60 when it assumes the position shown in FIG. 5 and when the pin 63 is not engaged by the upper arm 65a of the trip 65. The arm 70a is slightly shorter than the arm 65a so that it can bypass the pin 63 when the latter is engaged by the arm 65a. The lower arm 70b of the auxiliary trip 70 normally engages a bent-over portion 72 of the shank 55 of the release element 54.

A pawl 73 is pivotable on the shaft 18 to move into and from engagement with a projection 74 on the driving member 36. The pawl 73 can be pivoted by a link 75 which is movable up and down by a lever 76 connected with the rear curtain of the shutter. A bell crank 77 is rotatable on the shaft 18 and is biased in a clockwise direction by a torsion spring 78. When the arm 77a of the bell crank 77 engages a stop 79, the other arm 77b of the bell crank engages the projection 74 of the driving member 36. The length of the arm 77b is slightly less than the length of the pawl 73. A bar 80 is provided with a bent end portion 80a which can pivot the pawl 22 and with a projection 80b which can pivot the bell crank 77. A manually pivotable selector lever 81 is mounted on a pivot pin 82 of the camera body 1 and its upper arm is provided with a knob 83. The lower arm of the selector lever 80 is bifurcated, as at 84, and receives a pin 85 on the bar 80. Thus, the bar 80 can be moved back and forth in response to pivoting of the selector lever 81.

The operation of the camera shown in FIGS. 5 to 7 is as follows:

When the user rotates the crank 44 in a counterclockwise direction (indicated by the arrow), the gear 45 rotates the gears 46 and 57 to actuate the mirror moving mechanism and to cock the focal plane shutter. The lobe 43a of the cam 43 moves the follower 47 from the phantom-line position to the solid-line position of FIG. 6. The follower 47 pivots the lever 38 in a counterclockwise direction to thereby rotate the driving member 36 in a clockwise direction against the opposition of the spring 37. The driving member 36 moves its projection 74 into engagement with the pawl 73. The spring 37 biases the gear segment 17 in a clockwise direction but the gear segment cannot rotate because its projection 23 is engaged by the pawl 22. The mirror 3 remains in the position shown in FIGS. 5 and 6.

The gear 57 which is rotated by the gear 45 in response to rotation of the crank 44 in a counterclockwise direction causes the cam 58 to pivot the holder 59 which moves the front curtain of the shutter so that the shutter is cocked. The lever 81 is in the position which is shown in FIG. 6 by solid lines. Therefore, the projection 80b of the bar 80 maintains the bell crank 77 in the position of FIG. 6 in which the projection 80b bears against the arm 77a and maintains the spring 78 in stressed condition. As stated before, the arm 77b is slightly shorter than the pawl 73 so that it can bypass the projection 74 of the driving member 36. The user thereupon depresses the release element 54 so that the shank 55 moves inwardly and its portion 72 pivots the lower arm 70b of the auxiliary trip 70 in a counterclockwise direction, as viewed in FIG. 5. The arm 70a is then moved away from the pin 63. Since the arm 70a is shorter than the trip 65, it can pivot without touching the pin 63.

The projection 56 of the shank 55 pivots the lever 52 which moves the link 51 by way of the coupling pin 53 whereby the end portion 51a of the link 51 pivots the pawl 22 in a clockwise direction to move the pallet of the pawl 22 away from the projection 23. The gear segment 17 rotates in a clockwise direction under the action of the spring 37 and drives the gears 10, 11 to thereby move the mirror 3 to the position shown in FIG. 7. As the frame 3' moves toward the position of FIG. 7, it engages the end portion 67a of the link 67 and pivots the trip 65 by simultaneously stressing the spring 69. The arm 65a of the trip 65 moves away from the pin 63. The spring 62 pivots the lever 60 in a counterclockwise direction and the pin 66 pivots the holder 59 in a clockwise direction so that the holder 59 is disengaged from the cam 58. The front curtain of the shutter is free to move to the open position.

When the movements of the front and rear shutter curtains are completed, the link 75 is pulled downwardly by the lever 76 which is connected to the rear shutter curtain whereby the pawl 73 moves away from the projection 74 of the driving member 36. The member 36 is then rotated in a counterclockwise direction by the spring 40 which is free to pivot the lever 38 in a clockwise direction. The pin 48 of the driving member 36 engages the stop 49 of the gear segment 17 to rotate the latter in a counterclockwise direction so that the gears 10, 11 return the mirror 3 to the operative position shown in FIGS. 5 and 6. It will be seen that, when the selector lever 81 is maintained in the solid-line position of FIG. 6, the mirror 3 automatically returns to the operative position of FIGS. 5 and 6 when the exposure is completed.

If the mirror 3 is to be maintained in the inoperative position of FIG. 7 during intervals between two or more successive exposures, the selector lever 81 is pivoted by way of the knob 83 so as to assume the phantom-line position of FIG. 6. Such pivotal movement of the selector lever 81 causes the projection 80b of the bar 80 to move forwardly, as viewed in FIG. 6, so that the bell crank 77 is free to pivot in a clockwise direction under the action of the spring 78 until the arm 77a reaches and abuts against the stop 79. The arm 77b then moves into the path of the projection 74 on the driving member 36. The end portion 80a of the bar 80 pivots the pawl 22 in a clockwise direction to disengage the pawl from the projection 23 so that the gear segment 17 turns in a clockwise direction and causes the gears 10, 11 to move the mirror 3 to the position shown in FIG. 7.

As the mirror frame 3' moves toward the position of FIG. 7, it engages the end portion 67a and lifts the link 67 which disengages the arm 65a of the trip 65 from the pin 63. However, since the release element 54 is in the idle position, the lever 60 pivots very slightly in a counterclockwise direction so that its pin 63 engages the auxiliary trip 70. When the user wishes to make an exposure, the release element 54 is depressed to disengage the auxiliary trip 70 from the pin 63 so that the lever 60 is free to pivot in a counterclockwise direction and disengages the holder 59 from the cam 58. The front curtain of the shutter is then free to move.

When the shutter closes to complete the exposure, the lever 76 which cooperates with the rear shutter curtain causes the link 75 to disengage the pawl 73 from the projection 74 of the driving member 36. However, the bell crank 77 merely permits the driving member 36 to rotate very slightly in a counterclockwise direction until the projection 74 strikes against the arm 77b. Thus, the mirror 3 remains in the position shown in FIG. 7. The opening of the shutter can be repeated as often as desired, as long as the selector lever 81 remains in the phantom-line position of FIG. 6.

Thus, the selector lever 81 can assume a first position in which it enables the mechanism of the camera to return the mirror 3 to the operative position of FIG. 5 after each exposure, and a second position in which the mirror 3 is held in the inoperative position of FIG. 7 during and between two or more successive exposures.

An important advantage of the improved camera is that the mirror portions 3a, 3b of FIGS. 1–4 or the mirror 3 of FIGS. 5–7 cannot cause secondary reflection of light which enters the camera body 1 when the user makes an exposure. The reflecting surface of the mirror portion 3a or of the mirror 3 shown in FIGS. 5–7 faces upwardly and is adjacent to the underside of the focussing screen 30 when the camera is set to make an exposure, and the reflecting surface of the lower mirror portion 3b then faces the internal wall 1' of the body 1 so that it cannot reflect light which enters by way of the lens 2. The improved mirror can be incorporated in cameras employing lenses with short focal length as well as large-diameter lenses. The improved mirror allows for the use of a compact camera body even if the camera uses a large film. The secondary reflection is prevented without the utilization of a separate light-intercepting element, such as a plate or the like. The lens 29 insures that the boundary line 31 between the mirror portions 3a and 3b is not seen on the focussing screen 30.

The improved camera is susceptible of many additional modifications without departing from the spirit of the invention as defined in the appended claims.

What is claimed is:

1. In a single-lens reflex camera, a combination comprising a camera body having a front portion and a rear portion; a lens mounted in said front portion; focusing means mounted in said body at a level above said lens and including a stationary light-dispersing element; means for reflecting against said focusing means at least some scene light entering said body by way of said lens, comprising at least one mirror mounted in said body behind said lens and being movable with reference to said focusing means between an operative position at an acute angle to the optical axis of said lens to reflect scene light against said focusing means and an inoperative position; and actuating means for moving said mirror between said positions, said actuating means defining for said mirror a pivot axis which is at least substantially normal to said optical axis and said actuating means having drive means for pivoting said mirror about said pivot axis with reference to said focusing means and for moving said pivot axis along a curved path in a direction towards said rear portion of said camera body and simultaneously upwards towards said stationary light-dispersing element so that due to such combined movement of said mirror axis said mirror will bypass said lens during its movement towards said light-dispersing element.

2. A combination as defined in claim 1, wherein said pivot axis is located at a level above said optical axis and said drive means is arranged to move said pivot axis upwardly and away from said lens while said mirror pivots during movement from said operative to said inoperative position.

3. A combination as defined in claim 1, further comprising release means operative to effect a movement of said mirror to said inoperative position, film advancing means actuatable to advance the film with reference to said lens, and means for returning said mirror to said operative position in response to actuation of said film advancing means.

4. A combination as defined in claim 3, further comprising selector means operable to effect retention of said mirror in said inoperative position.

* * * * *